(12) United States Patent
Kwak

(10) Patent No.: US 8,694,388 B2
(45) Date of Patent: *Apr. 8, 2014

(54) DELIVERY MANAGEMENT SYSTEM AND METHOD USING SMART COMMUNICATOR

(75) Inventor: Se Jin Kwak, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,564

(22) Filed: Aug. 16, 2012

(65) Prior Publication Data

US 2012/0330782 A1 Dec. 27, 2012

Related U.S. Application Data

(62) Division of application No. 11/643,348, filed on Dec. 21, 2006, now Pat. No. 8,271,342.

(30) Foreign Application Priority Data

Jan. 2, 2006 (KR) .................. 10-2006-0000273

(51) Int. Cl.
*G06Q 30/00* (2012.01)

(52) U.S. Cl.
USPC ........................................ 705/26.1; 705/27.1

(58) Field of Classification Search
USPC .................................................... 705/26, 27
See application file for complete search history.

(56) References Cited

U.S. PATENT DOCUMENTS

| | | |
|---|---|---|
| 2002/0099567 A1 | 7/2002 | Joao |
| 2002/0169628 A1 | 11/2002 | Bauer |
| 2003/0079129 A1 | 4/2003 | Lindsay |
| 2003/0231112 A1 | 12/2003 | Raju |
| 2004/0030604 A1 | 2/2004 | Young |
| 2004/0204773 A1 | 10/2004 | Kim |
| 2004/0225624 A1 | 11/2004 | Reynolds et al. |
| 2005/0006452 A1 | 1/2005 | Aupperle et al. |
| 2005/0165612 A1 | 7/2005 | Van Rysselberghe |

FOREIGN PATENT DOCUMENTS

| | | |
|---|---|---|
| KR | 1020000059131 | 10/2000 |
| KR | 1020020091478 | 12/2002 |
| KR | 1020050109213 | 11/2005 |

OTHER PUBLICATIONS

Descartes: Internet Archive Wayback Machine, www.archive.org/www.descartes.com; 4 pgs., 2001.

Grygo, Eugene: "Postal Service Delivers Online," InforWorld, Proquest #47558471, 3 pgs., Dec. 27, 1999.

*Primary Examiner* — Rob Pond

(74) *Attorney, Agent, or Firm* — The Farrell Law Firm, P.C.

(57) ABSTRACT

Disclosed is a delivery management system and method using a smart communicator that include a selling server for selling articles online; a delivery server for managing delivery of articles sold by the selling server; a mailbox which reads information from an information storage attached to an arrived article at a destination under the control of the delivery server; and a home network server, which stores ordered article information, determines whether the arrived article is correctly delivered based on a comparison between the ordered article information and the arrived article information read from the information storage, transmits the result of the comparison to a smart communicator, controls follow-up management of the delivery according to a remote control of the smart communicator, to verify article arrival, and controls follow-up management using the smart communicator.

13 Claims, 7 Drawing Sheets

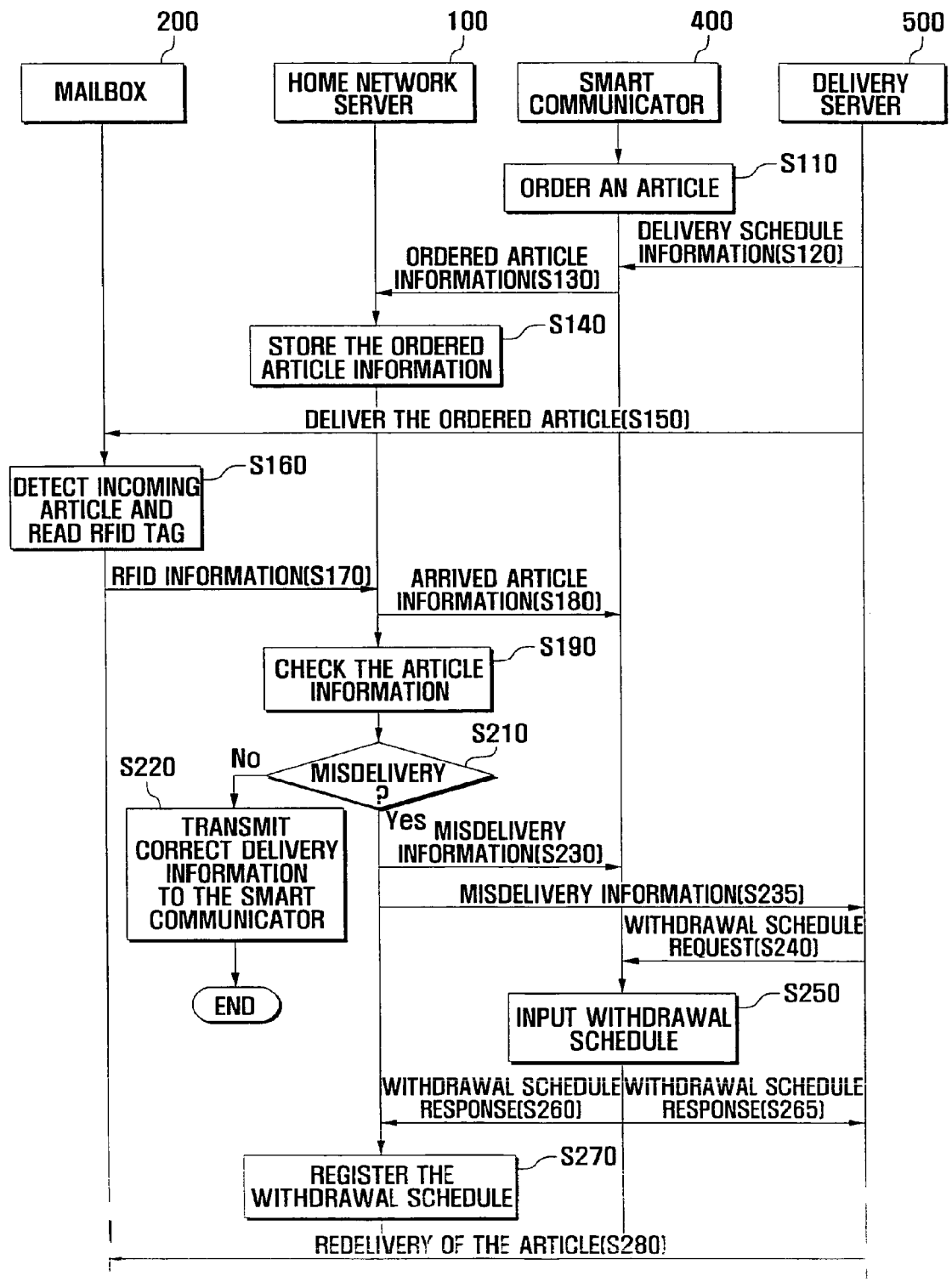

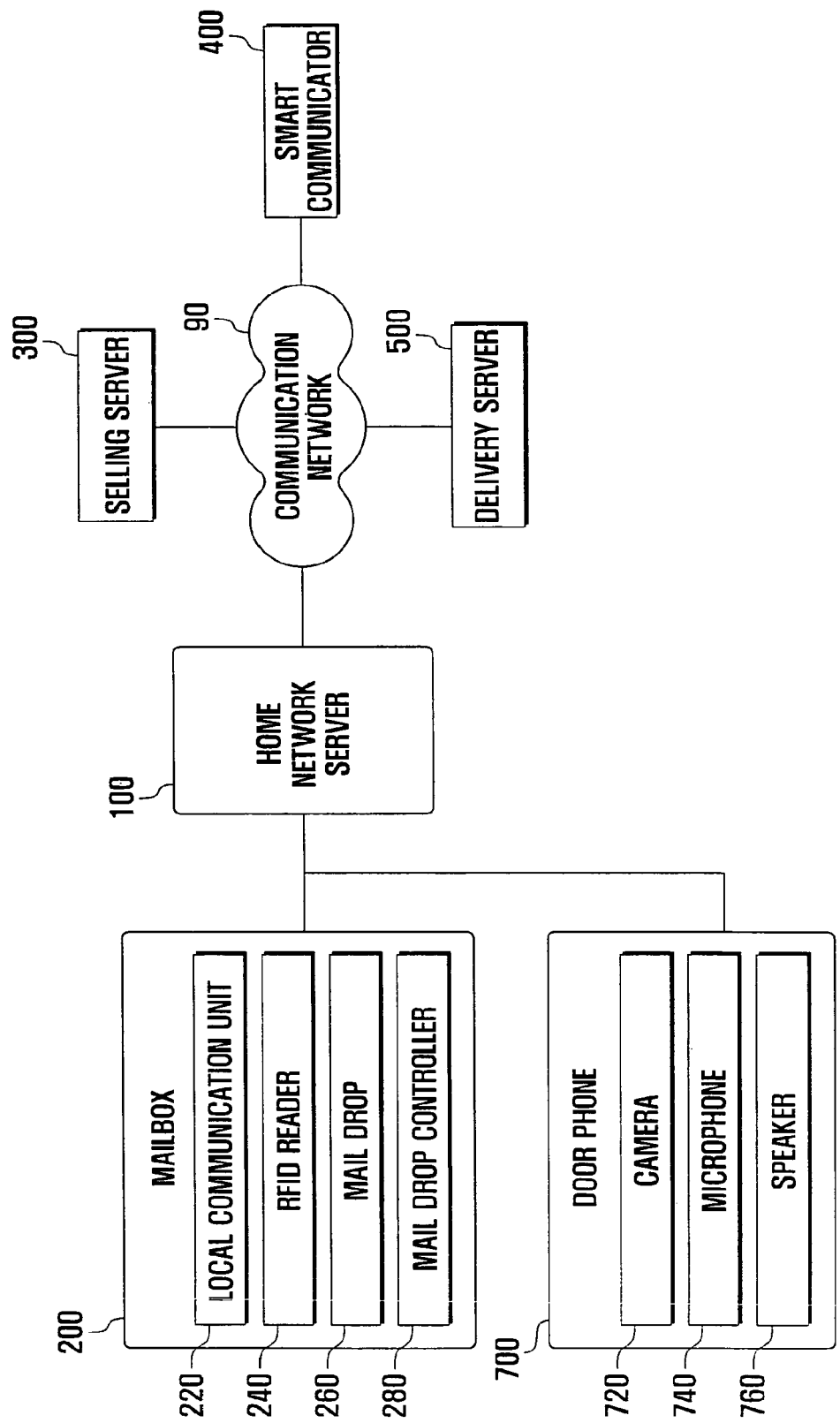

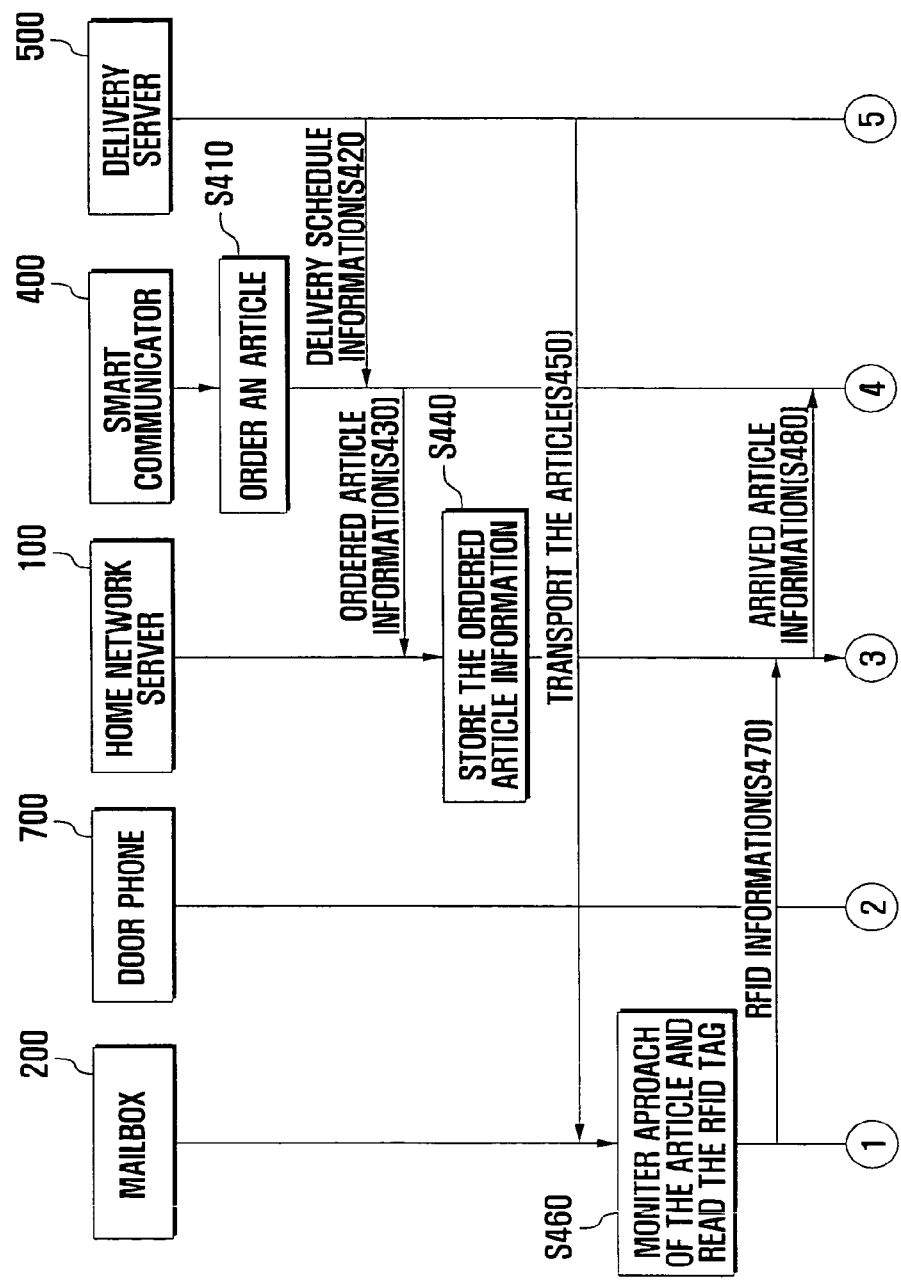

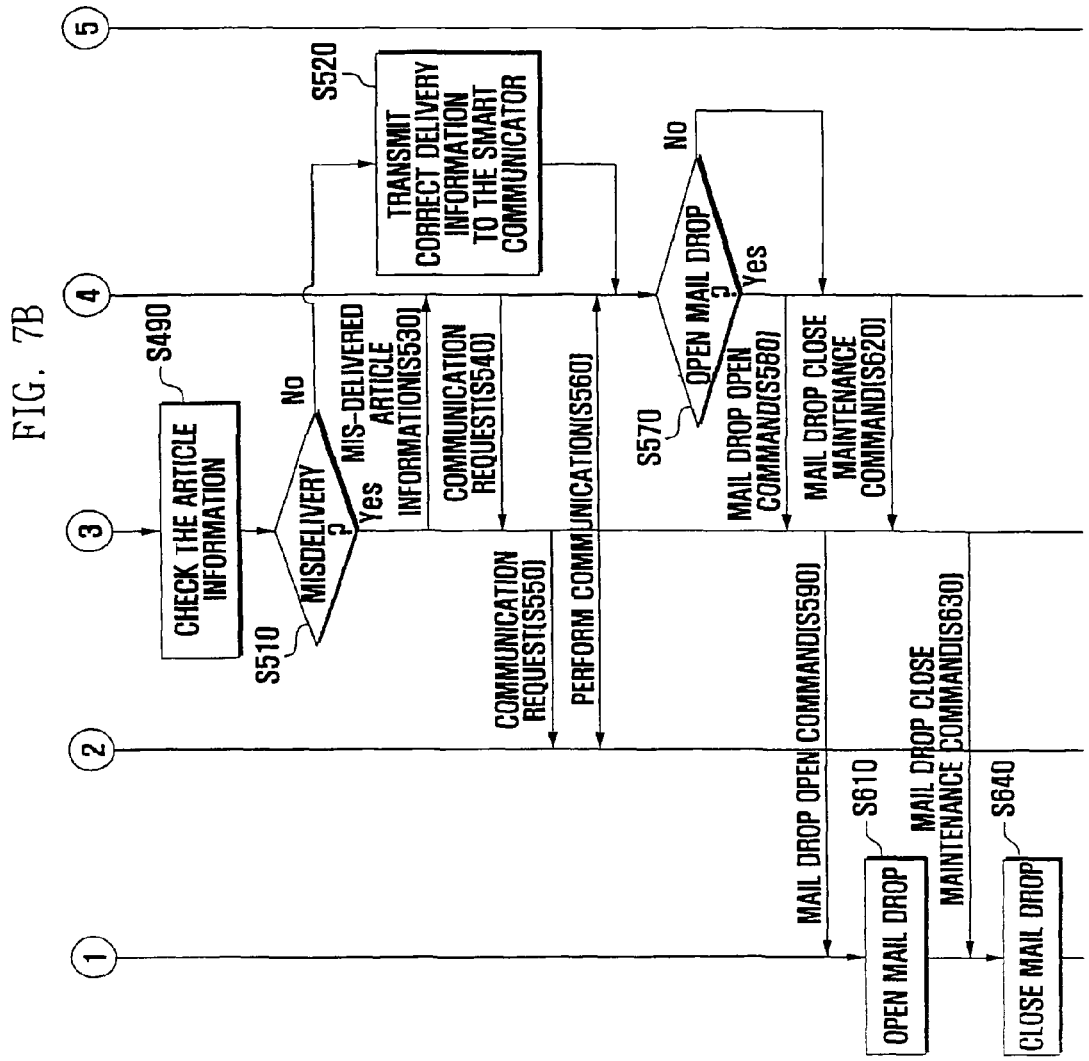

US 8,694,388 B2

DELIVERY MANAGEMENT SYSTEM AND METHOD USING SMART COMMUNICATOR

PRIORITY

This application is a Divisional Application of U.S. patent application Ser. No. 11/643,348, filed in the U.S. Patent and Trademark Office on Dec. 21, 2006, and claims priority under 35 U.S.C. §119 to an application filed in the Korean Intellectual Property Office on Jan. 2, 2006 and assigned Serial No. 10-2006-0000273, the contents of each of which are incorporated herein by reference.

BACKGROUND OF THE INVENTION

1. Field of the Invention

The present invention relates to a delivery management system and method and, in particular to, a delivery management system and method which is capable of remotely controlling follow-up management on the articles delivered correctly or incorrectly using a smart communicator.

2. Background of the Related Art

As communication, home automation, and online ordering technologies have been rapidly developed the quality-of-life has also improved, especially in terms of a residential environment. Such a convenient residence can be achieved with integral management of the household electronics such as electric appliances, lighting systems, cooling and heating systems, security systems, gas delivery systems, electric delivery systems, door locks and entry systems, etc.

Home automation is a specialized field that deals with the specific automation requirements of private homes and the application of automation techniques for comfort and security of inhabitants of a residential structure. For example, home automation can be implemented using remote control devices and/or systems such as a remote control means for controlling household appliances located inside and/or outside of the home (e.g., refrigerators, lights, pool filters, etc.), a video door phone system for communicating with a visitor on a video screen, a security mechanism for detecting and alerting of the presence of one or more intruders, an alarm system for detecting and alerting of gas leaks and fire, and meter reading means for remotely reading utility meters.

In the meantime, with the advent of online shopping goods can be are ordered at online shopping malls through Internet and delivered to a desired location through offline distribution chains.

FIG. 1 is a schematic block diagram illustrating a conventional online shopping and delivery system. The consumer 10 accesses a shopping mall site of a seller 40 through Internet 20 and sends a purchase order to the seller 40 after selecting goods to buy. If the purchase order is made by the consumer 10, the seller 40 request for payment on the goods to the consumer 10. The consumer 10 pays for the goods through a payment system provided by a payment server 30. After the payment is successfully completed, the seller 40 requests a delivery server 50 of an affiliated distribution company to transport the goods and reports the information on the delivery of the goods.

Through this procedure, the consumer 10 completes the order of the product and identifies the goods with the delivery information. Typically, the seller 40 or the delivery server 50 provides a service for tracking the goods to the consumer 10.

In the conventional delivery system, however, it is difficult to determine the location of the goods in real-time and an arrival date and time since the shipment information typically provides only loading and/or unloading locations and/or dates. Accordingly, the consumer typically must guess the arrival date and stay at the destination location in order to receive the goods when delivered.

Moreover, conventional delivery systems has a drawback in that the consumer should be located at the destination location even when the goods are delayed or re-transported due to a misdelivery.

In the meantime, the conventional postal system has drawbacks in that the recipient should check a mailbox frequently especially when mail is to be expected to determine whether any mail has arrived. Furthermore, the mailbox is usually not secure in that the mailbox can be typically accessed by anybody, resulting in the deposit of unwanted advertisements (e.g., flyers, etc.). Moreover, with the advent of identity theft, it is necessary to secure delivered mail.

SUMMARY OF THE INVENTION

The present invention has been made in an effort to solve the above problems, and it is an object of the present invention to provide a delivery system and method capable of tracking in real-time ordered goods and remotely controlling the delivery of the goods according to the tracking results using a smart communicator.

It is another object of the present invention to provide a delivery system and method capable of preventing unauthorized materials from being placed in a mailbox by controlling an access door of the mailbox.

In accordance with one aspect of the present invention, the above and other objects can be accomplished by a delivery management system. The deliver management system includes a selling server for selling articles online; a delivery server for managing deliveries of articles sold by the selling server; a mailbox for reading information from an information storage means attached to the article (e.g., that has arrived at a destination) under the control of the delivery server; and a home network server for storing ordered article information, determining whether the arrived article is correctly delivered on the basis of comparison between the ordered article information and the arrived article information read from the information storage means, transmitting results of the comparison to a smart communicator, and controlling follow-up management of the delivery according to a remote control of the smart communicator.

Preferably, the information storage means includes a radio frequency identification (RFID) tag and the ordered article information includes ordered articles list schedule and a delivery schedule each corresponding to ordered article.

Preferably, the home network server transmits misdelivery information to the delivery server when an arrived article is mis-delivered; the delivery server requests information for re-delivery of the ordered article and information for withdrawal of the mis-delivered article to the smart communicator; and the smart communicator transmits the information for re-delivery of the ordered article and information for withdrawal of the mis-delivered article, which is optionally input by user of the smart communicator, to the home network server and the delivery server.

Preferably, the mailbox includes an RFID reader which reads information from the RFID tag attached to the article (to be thrown into the mailbox or located within the mailbox) and a local communication module which transmits the information read from the RFID tag to the home network server. Alternatively, an RFID reader can be remotely located with respect to the mailbox.

Preferably, the home network server includes a local communication unit which receives information read from an RFID tag from the mailbox through a local communication link; a remote communication unit which communicates with the smart communicator and receives one or more remote control commands from the smart communicator; a storage unit which stores ordered article information relating to an ordered article; an article information analysis unit which determines whether an arrived article is correctly delivered by comparing the ordered article information and the information read from the RFID tag; and a control unit which transmits misdelivery information to the smart communicator when the arrived article is determined to be mis-delivered and receives information for re-delivery of the ordered article and withdrawal of the mis-delivered article from the smart communicator.

Preferably, the smart communicator includes a local communication module which receives the misdelivery information from the home network server and transmits the information for re-delivery of the ordered article and withdrawal of the mis-delivered article to the home network server; a storage means stores the ordered article information and the information for re-delivery of the ordered article and withdrawal of the mis-delivered article; a user input such as a keypad, touch screen, voice activated input, etc., which enables a user to input data relating to the information for re-delivery of the ordered article and withdrawal of the mis-delivered article; and a controller which transmits the information for re-delivery of the ordered article and withdrawal of the mis-delivered article to the home network server and the delivery server.

In accordance with another aspect of the present invention, the above and other objects can be accomplished by a delivery management method using a smart communicator, the method including ordering an article from a selling server online; storing ordered article information received from the smart communicator; reading an article identifier attached to, or otherwise associated with, the article; transmitting information of the article identifier to the smart communicator; determining whether an arrived article is correctly delivered on the basis of the article identifier; transmitting information on whether the article is correctly delivered to the smart communicator; and managing re-delivery of the ordered article and/or withdrawal of a mis-delivered article based on the determination.

Preferably, the step of managing the re-delivery of the ordered article and/or withdrawal of the mis-delivered article includes transmitting misdelivery information to a delivery server when it is determined that the arrived article is a mis-delivered article; receiving information for re-delivery of the ordered article and withdrawal of the mis-delivered article in response to a request from the delivery server; and managing the re-delivery of the ordered article and withdrawal of the mis-delivered article according to one or more predetermined routines corresponding to at least one of the ordered article and the mis-delivered article.

Preferably, the article identifier includes a radio frequency identification (RFID) tag and the ordered article information includes an ordered article list and delivery schedules corresponding to the ordered article. Furthermore, the ordered article list and the delivery schedule can include data corresponding to a plurality of ordered articles.

In accordance with another aspect of the present invention, the above and other objects can be accomplished by a delivery management system that includes a selling server which sells articles online; a delivery server which manages deliveries of articles sold by the selling server; a mailbox having an mail drop, which reads information from an information storage attached to, or otherwise associated with, an approaching article under the control of the delivery server and controls the mail drop to be opened or closed according to an approval or denial of the article; and a home network server which stores ordered article information, determines whether the arrived article is correctly delivered on the basis of comparison between the ordered article information and the arrived article information read from the information storage, transmits the comparison result to a smart communicator, and controls follow-up management of the delivery according to a remote control of the smart communicator.

Preferably, the home network server includes a communication device, such as, a door phone, camera, etc., that establishes a communication link with the smart communicator via the home network server such that a deliveryman and a smart communicator communicate through the communication link for identifying the article.

Preferably, the article identifier includes a radio frequency identification (RFID) tag and the ordered article information includes an ordered article list and a delivery schedule corresponding to the ordered article. Furthermore, the ordered article list and the delivery schedule can include data corresponding to a plurality of ordered articles.

Preferably, the home network server transmits a denial information to the smart communicator when arrived article authentication is denied; the smart communicator selectively performs an establishment of a communication link to the communication device (e.g., the door phone) such that user can communicate with the delivery man, and transmits an open/close command input by the user to the home network server; and the home network server controls such that the mail drop of the mailbox is opened or closed according to an open/close command.

Preferably, the mailbox includes a RFID reader which reads information from the RFID tag attached to, or otherwise associated with (e.g., contained within, etc.), the arrived article; a local communication module which transmits the information read from the RFID tag to the home network server; and an mail drop controller which controls access to the mail drop according to the open/close command received from the smart communicator.

In accordance with still another aspect of the present invention, the above and other objects can be accomplished by a delivery management method using a smart communicator for ordering an article from a selling server online; storing, by a storage means, ordered article information received from the smart communicator; transmitting information of an article identifier attached to, or otherwise associated with, an approaching article to the smart communicator; determining whether the arrived article is approved on the basis of article identifier; transmitting information on whether the article is approved to the smart communicator; and controlling a mail drop to be opened or closed according to a remote control of the smart communicator on the basis of the information on whether the article is approved.

Preferably, the step of controlling the mail drop includes transmitting denial information to a delivery server when the article is denied; performing communication between a smart communicator user and a deliveryman through a communication device (e.g., a door phone a picture phone, etc.) according to the denial information; receiving information on whether to open or close the mail drop from the smart communicator; and controlling the mail drop to be opened or closed according to a control command from the smart communicator.

Preferably, the article identifier includes a radio frequency identification (RFID) tag and the ordered article information include ordered articles list and delivery schedules of the ordered article.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 5 is a flow diagram illustrating a method for remotely checking the delivered article using the smart communicator according to a first embodiment of the present invention;

FIG. 6 is a block diagram illustrating an article delivery checking system using a smart communicator according to a second embodiment of the present invention; and FIGS. 7A to 7B are flow illustrating a method for remotely checking the delivered article using the smart communicator according to the second embodiment of the present invention.

DETAILED DESCRIPTION OF THE PREFERRED EMBODIMENT

Figure 1:
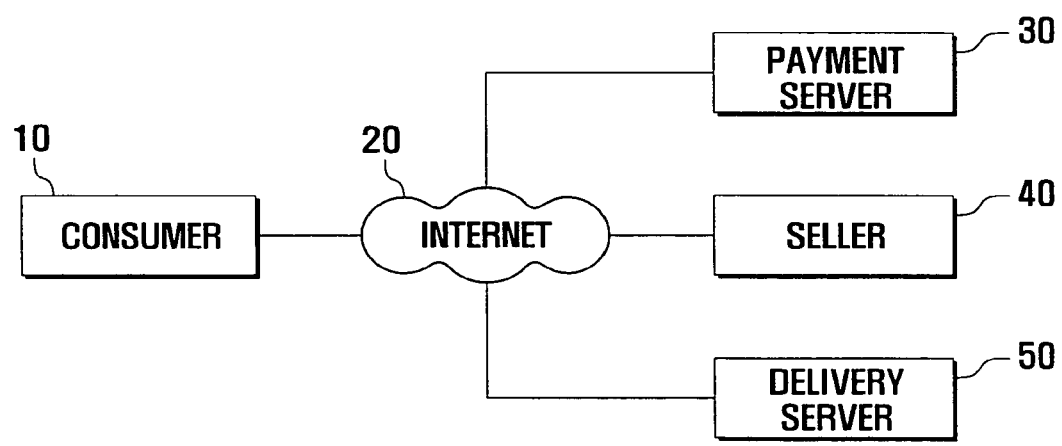
FIG. 1 is a schematic block diagram illustrating a conventional online shopping and delivery system.

Preferred embodiments of the present invention will be described with reference to the accompanying drawings in detail. Wherever possible, the same reference numbers will be used throughout the drawing(s) to refer to the same or like parts. Detailed descriptions of well-known functions and structures incorporated herein will be omitted when it many obscure the subject matter of the present invention.

Figure 2:
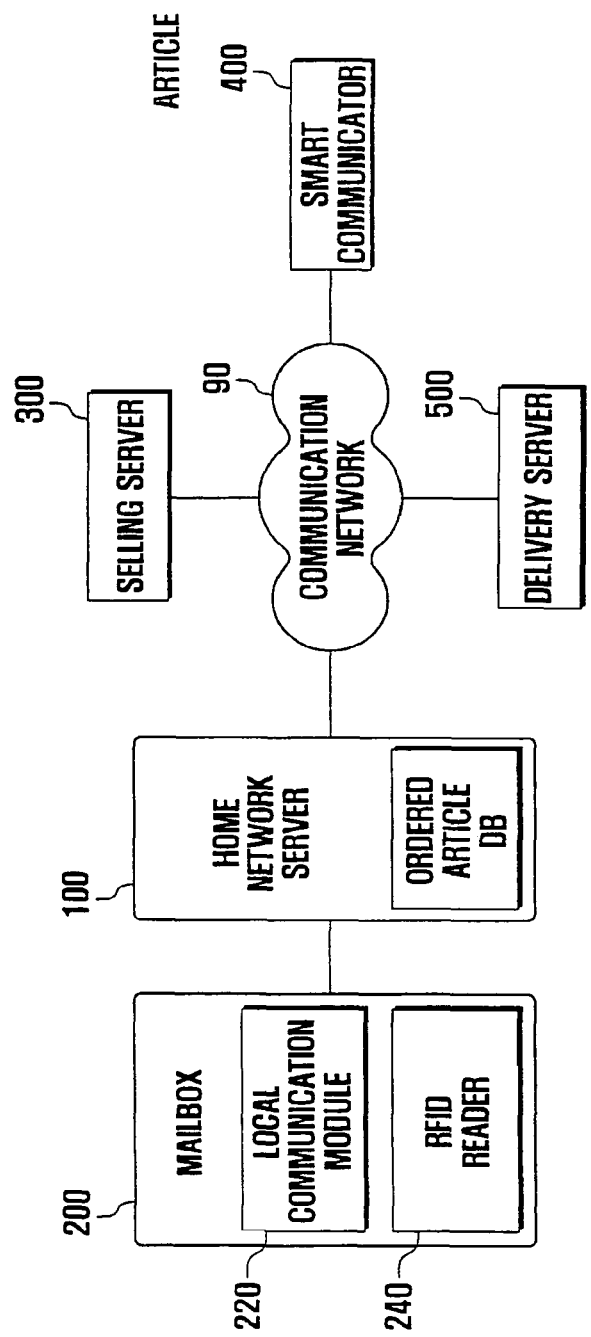
FIG. 2 is a block diagram illustrating an article tracking system according to the present invention.

FIG. 2 is a block diagram illustrating an article tracking system according to the present invention.

As shown in FIG. 2, the article tracking system according the present invention includes a home network server 100 for internetworking and controlling home network appliances and a smart communicator 400 connected to the home network server 100 through a public communication network 90 so as to control the home network appliances by transmitting control commands to the home network server 100. The home network server 100 can receive, from the smart communicator 400 or other communication devices, information on one or more articles ordered (or reserved to be transported) from, for example, an online shopping mall site provided by a selling server 300 in a form of one or more short messages (SMS messages) or electronic mail (e.g., e-mail). Upon receiving the one or more SMS messages or e-mail containing information on the articles ordered, the home network server 100 stores information relating to the ordered articles (not shown) in a database.

Also, the home network server communicates with (e.g., is electrically coupled to) a mailbox 200 having an access restricting device (e.g., a door-not shown) for selectively restricting access to an internal space (not shown) for storing received articles. Also, the mailbox 200 is provided with a local communication module 220 and a radio frequency identification (RFID) reader 240. The local communication module 220 communicates with the home network server 100 through a wired or a wireless link. The RFID reader 240 reads information from the RFID tag corresponding to (e.g., attached to) the article to be thrown into the mail box 200). The local communication module 220 transmits the information read by the RFID reader 240 to the home network server 100.

The home network server 100 notifies the user, by transmitting an arrival message to the smart communicator 400, of the arrival of the article when the article is thrown into the mail box 200. The home network server 100 compares the article information received from mail box 200 and the previously stored article information and determines whether the article is correctly delivered on the basis of the comparison. The home network server 100 transmits the determination result to the smart communicator 400. In case of misdelivery, the home network server 100 transmits the misdelivery information to a delivery server 500.

The delivery server 500 schedules deliveries of articles registered by the selling server 300 and transmits a withdrawal schedule request message to the smart communicator 400.

The smart communicator 400 has a remote control function for controlling the home network server 100 that can be located within the home (or can be optionally located at a remove location) using a predetermined communication scheme and can perform bidirectional communication with the home network server 100. Also, the smart communicator 400 can access to the shopping mall site provided by the selling server 300 through the communication network 90 so as to order articles and receive the delivery information of the articles ordered to the selling server 300 from the delivery server 500. The smart communicator 400 transmits the ordered article information including the delivery information to the home network server 100 through the communication network 90.

The smart communicator can 400 transmit a withdrawal schedule response message to the home network server 100 in response to a withdrawal schedule request message, to the home network server 100 and the delivery server 500, the withdrawal schedule response message can include re-delivery schedule information input by the user.

Sequentially, the home network server 100 registers a withdrawal schedule of the mis-delivered article received from the withdrawal schedule response message and checks the arrival and misdelivery of the ordered article. Also, the delivery server 500 schedules the re-delivery of the mis-delivered article on the basis of the withdrawal schedule response message.

As described above, the home network server stores the ordered article information and the delivery information of the ordered article in a database, reads the RFID attached to the article thrown into the mailbox 200, determines whether the article thrown in to the mailbox is correctly delivered, transmits the determination result to the smart communicator 400, and manages the re-delivery and withdrawal of a mis-delivered article under the control of the smart communicator 400. Accordingly, the user can check the delivered article and manage the misdelivery and redelivery schedule mis-delivered article by remotely controlling the home network server 100 using the smart communicator.

Figure 3:
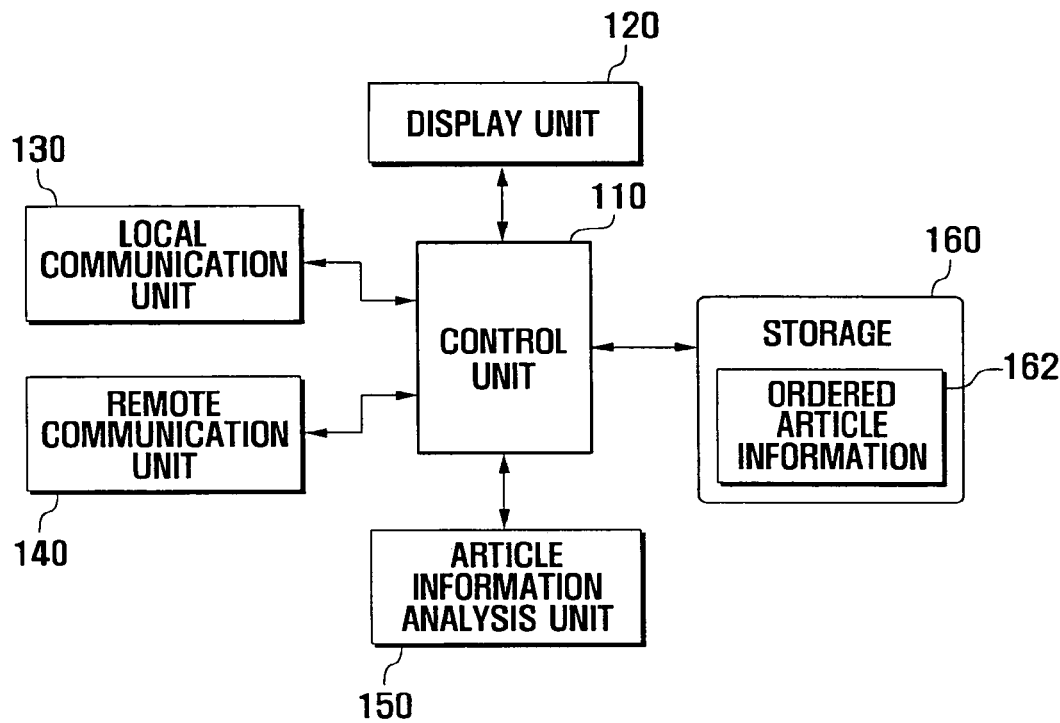
FIG. 3 is block diagram illustrating the home network server of FIG. 2 in more detail.

FIG. 3 is block diagram illustrating a home network server of FIG. 2 in more detail. As shown in FIG. 3, the home network server 100 includes a control unit 110, a display unit 120, a local communication unit 130, a remote communication unit 140, an article information analysis unit 150, and a storage unit 160.

The control unit 110 controls the overall operation of the home network server 100 and one or more optional home network appliances electrically connected to (or otherwise communications with) the home network server 100.

The control unit 110 determines whether the article thrown in to the mailbox is correctly delivered by comparing the information read from the RFID tag corresponding to (e.g., attached to) the article and the previously stored delivery information. If it is determined that the article is mis-delivered, the controller unit 110 controls so as to manage the misdelivery and re-delivery schedule.

The display unit 120 displays the operation status of the home network server 100 and information received from the home network appliances connected to the home network server 100. In this embodiment, the display unit 120 may also display information read from the RFID tag attached to the article.

The local communication unit 130 can communicate with the one or more home network appliances and the smart communicator 400 through wired or wireless communication links. For example, the local communication unit 130 can communicate with the local communication module 220 of the mailbox through the wired or wireless link and can communicate with the smart communicator 400 in the home.

The remote communication unit 140 has a remote communication function so as to communicate with the smart communicator 400 through the communication network 90. The remote communication unit 140 can access the selling server 300 through the smart communicator 400 or via other communication devices and can receive the ordered article information containing the delivery information from the smart communicator 400 or the other communication devices, the delivery information being provided by the delivery server which manages the information on the ordered article and the ordered article delivery. Also, the remote communication unit 140 transmits the article arrival information and the misdelivery information obtained from the mailbox 200 to the smart communicator 400 and receives remote control commands from the smart communicator 400.

The article information analysis unit 150 determines whether the article thrown in the mailbox, is correctly delivered on the basis of the ordered article information received from the smart communicator 400 and/or other communication devices and the information read from the RFID tag attached to the article.

The storage unit 160 stores the programs for operating the home network and the settings of the home network configured by the user for interoperating the home network appliances. The storage unit 160 can also store the ordered article information containing the delivery schedule, which is transmitted from the smart communicator 400 and/or other communication devices.

Figure 4:
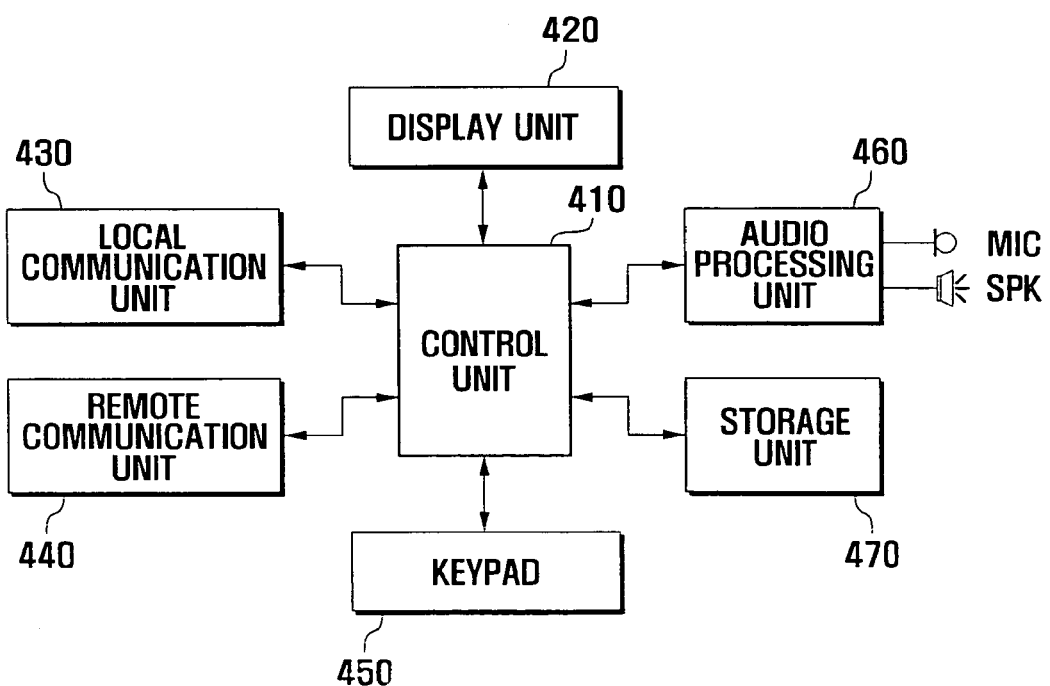
FIG. 4 is a block diagram illustrating the smart communicator of FIG. 2 in more detail.

FIG. 4 is a block diagram illustrating the smart communicator of FIG. 2 in more detail. As shown in FIG. 4, the smart communicator includes a control unit 410, a display unit 420, a local communication unit 430, a remote communication unit 440, a keypad (or other input device) 450, an audio processing unit 460, and a storage unit 470.

The control unit 410 controls the overall operations of the smart communicator 400, accesses to the selling server 300 and the delivery server 500 through the communication 90, and remotely controls the home network server 100.

The display unit 420 displays the operational status of the smart communicator 400, delivery and ordered article information, article arrival and misdelivery information received from the home network server 100, schedules, information input from the keyboard, etc.

The local communication unit 430 provides a wireless local area communication function for controlling the operation of the home network server 100 in the home.

The remote communication unit 440 supports wired and/or wireless Internet communication through the communication network 90 such that the smart communicator can communicate with the home network server 100 which can be remotely located. Accordingly, the remote communication unit 440 can transmit commands for controlling the home network server 100 and receive the operation status information generated by the home network server 100. Also, the remote communication unit 440 transmits the ordered article information and the mis-delivered article withdrawal information to the home network server 100 and receives the misdelivery information from the home network server 100.

The keypad 450 is provided with a plurality of keys so as to input commands for controlling the operation of the smart communicator 100 and the home network server 100 outside of the home and ordering and paying for the article, and to input the re-delivery and withdrawal schedule information. Additionally, the keypad can include input devices such as a touch-screen input, a credit card reader, an RFID reader for reading RFID tags to obtain user information, a mouse/trackball, an optical input (e.g., a camera and/or a bar-code scanner), etc. all of which are not shown for the sake of clarity.

The audio processing unit 460 supports voice communication of the smart communicator 400. In this regard, the audio processing unit 460 can convert an analog audio signal input from the microphone into digital signal under the control of the control unit 410 and can convert a digital audio signal input from the controller 410 into analog signal so as to be output through the speaker.

The storage unit 470 stores the programs required for operating the smart communicator 400 and the settings associated with the operation of the home network server 100. Also, the storage unit 470 stores the delivery information and ordered article information.

FIG. 5 is a flow diagram illustrating a method for remotely checking the delivered article using the smart communicator according to the present invention. Referring to FIG. 5, the smart communicator 400 accesses to the selling server 300 to order an article and pay for the ordered article at step S110, and receives the delivery schedule information on the ordered article from the delivery server 500 at step S120.

The smart communicator 400 transmits the ordered article information including the delivery schedule information to the home network server 100 at step S130. The home network server 100 stores the ordered article information received from the smart communicator 400. In the meantime, the delivery server 500 executes the delivery of the ordered article to the mailbox 200.

The mailbox 200 detects an incoming article and reads the information from the RFID tag attached to (or otherwise associated with) the incoming article at step S160. The mailbox 200 transmits the information read from the RFID tag corresponding with the incoming article to the home network server 100 at step S170. The mailbox 200 can detect the incoming article using any suitable means. For example, the RFID reader can detect the RFID tag associated with the article. However, to save energy, the detection devices such as a motion sensing device, an optical sensor, a pressure-sensitive switch, a polling device, etc., can be used to activate the RFID reader. However, the RFID reader can also be operated continuously if desired.

Upon receiving the RFID information corresponding to the article thrown in the mail box 200, the home network server 100 transmits the article arrival information to the smart communicator 400 at step S180. Here, the home network server 100 checks that the ordered article is normally delivered on the basis of the ordered article information provided by the smart communicator at step S190 and determines whether the article is mis-delivered at step S210. In case of the correct delivery, the home network server 100 transmits the correct delivery information to the smart communicator 400 at step S220.

On the other hand, if it is determined that the article arrived is mis-delivered, the home network server 100 transmits the misdelivery information to the smart communicator 400 and the delivery server 500 at step S230. Upon receiving the misdelivery information, the delivery server 500 transmits a withdrawal schedule request message to the smart communicator 400 at step S240. If the withdrawal schedule request message is received, the smart communicator 400 waits for the user to input a withdrawal schedule at step S250.

Preferably, the withdrawal schedule is input by the user in response to the withdrawal schedule request (message) when the article is mis-delivered, however, the smart communicator 400 can be configured to access the delivery server 500 so as to check the misdelivery of the article and receive the information of the re-delivery and withdrawal of the article. The withdrawal schedule information can also correspond with a predetermined routine.

Once the withdrawal schedule information is input, the smart communicator 400 transmits the withdrawal schedule information to the home network server 100 and the delivery server 500 at steps S260 and S265. Upon receiving the withdrawal schedule information, the home network server 100 registers the withdrawal schedule at step S270 and the delivery server 500 controls so as to attempt delivery of the ordered article and to withdraw the mis-delivered article on the basis of the withdrawal schedule information at step S280.

That is, the home network server stores the delivery information of the ordered article in the form of database, reads the RFID tag attached to the article thrown into the mailbox 200, determines whether the article is correctly delivered, and transmits the determination result to the smart communicator 400, and manage the delivery of the article by registering the re-delivery and the withdraw schedule under the remote control of the smart communicator 400, such that it is possible to remotely monitor the delivery of the article and scheduling the withdrawal of the mis-delivered article when a mis-delivery is detected using the smart communicator 400.

FIG. 6 is a block diagram illustrating an article delivery checking system using a smart communicator according to another aspect of the present invention.

As shown in FIG. 6, the home network server 100 can control the internetworking of home network appliances 700 and performs operations corresponding to the control commands transmitted from the smart communicator 400. The home network server 100 can access the selling server 300 and delivery server 500 and receive the information on the ordered article and/or a reserved delivery article in the form of a (e.g., SMS) short message or e-mail through the smart communicator 400 and/or the other communication devices, using, for example, these devices. The home network server 100 can store the received information in a database as necessary. Also, the home network server 100 can access the mail box 200 and read the information corresponding an article from its corresponding RFID tag and control so as to open and/or close (or lock or unlock) the door of the mail box, as necessary. The home network server 100 supports the bidirectional communication between a door phone, etc., such that communication between a delivery person and other persons or devices is possible.

The mailbox 200 has the door and a space (e.g., a cavity) for storing the delivered article. The mailbox can include a local communication module 220, an RFID reader 240, a mail drop, and/or a mail drop controller 280.

The local communication module 220 supports a wired and/or wireless communication with the home network server 100. The RFID reader 240 can read information form the RFID tag attached the article before and/or after the article is thrown into the mail box 100. The local communication module 220 transmits the information read by the RFID reader 240 to the home network server 100. The mail drop 260 has a locking/unlocking structure to be closed (for preventing an object from being deposited in the mailbox) and opened (for allowing the deposit of the article into the mail box). The mail drop controller 280 controls such that the mail drop 260 is opened and/or closed according to an authentication result based on the information obtained from the RFID tag under the control of the home network server 100.

The home network server 100 stores the information on the order and delivery of the article purchased from the selling server 300, the information being received from the smart communicator 400.

Upon receiving the information read by the RF reader 240, the home network server 100 transmits the article arrival information to the smart communicator 400. The home network server 100 compares the information read form the RFID tag (of the arrived article) and the previously stored article information and determines whether to approve or deny the authentication corresponding to the arrived article. The home network server 100 transmits the delivery approval/denial information on the authentication of the article to the smart communicator 400. Also, the home network server 100 controls the mail drop 260 to be opened or closed according to the remote control command transmitted from the smart communicator 400, which enables the user to input the control command on the basis of the delivery approval/denial information.

The smart communicator 400 has a remote control function for controlling the home network server in a predetermined communication scheme such that it can communicate with the home network server 100 through the communication network 90. Also, the smart communicator can access the selling server 300, order the article online, and receive the delivery information of the ordered article through the communication network 90. The smart communicator 400 transmits the ordered article information including the delivery information to the home network server 100 through the communication network 90.

The smart communicator 400 can control the home network server 100 to open and close the mail drop 260 of the mailbox 200 according to the delivery approval/denial information received from the home network server 100.

The door phone 700 is installed outside the home such that it communicate with the smart communicator 400 via the home network server 100, resulting in communication between the deliveryman and the smart communicator user. The door phone 700 can be provided with communication devices such as a camera 720, a microphone 740, and/or a speaker 760. Additionally, the door phone 700 can include input devices such as a keyboard, etc.

The camera 720 is installed (e.g., in front of the door phone) so as to take pictures of a person facing the door and transmit the pictures to the home network server 100. The microphone 740 receives audio inputs (such as a deliveryman's voice) and transmits the audio input to the home network server 100. The speaker 760 outputs the audio signal received from the home network server 100.

If a request for communicating with the deliveryman is received from the smart communicator, the home network server 100 can control the door phone 700 to support the communication between the deliveryman and the smart communicator and/or its user.

As described above, the home network server 100 stores the information on the articles reserved to be delivered, reads the information from the RFID tag associated with the article, determines whether the arrived article is identical to or corresponds with any articles reserved to be delivered, transmits the comparison result to the smart communicator 400, and controls (e.g., closes or opens) the mail drop of the mailbox according to the remote command received from the smart communicator 400, such that it is possible to check the arrived article, determine to approve or deny the delivery of the article, and control the open/close of the mail drop 260 of the mailbox 200 on the basis of the determination result, even at a remote location.

FIGS. 7A to 7B are flowcharts illustrating a method for remotely checking the delivered article using the smart communicator according to the present invention.

First, the smart communicator 400 accesses the selling server 300 such that the smart communicator user can order an article and optionally pay for the ordered article at step S410. Thereafter, the smart communicator 400 receives ordered article information including the ordered article and delivery schedule information corresponding to the ordered article from the delivery server 500 at step S420.

The smart communicator 400 transmits the ordered article information including the ordered article and the delivery schedule to the home network server 100 at step S430. The home network server 100 stores the ordered article information received from the smart communicator 400 at step S440. In the meantime, the delivery server 500 controls such that the ordered article is transported to the mailbox 200 of the destination address according to the delivery schedule of the article at step S450.

The mailbox 200 detects the approach of the article and reads the information form the RFID tag associated with the article at step S460. The mailbox 200 then transmits the information read from RFID tag to the home network server 100 at step S470.

Upon receiving the information read from the RFID tag, the home network server 100 transmits article arrival information to the smart communicator 400 at step S480. Here, the home network server 100 checks that the arrived article is the ordered article by referring to the ordered article information that is received from the smart communicator 400 at step S490. Sequentially, the home network server 100 determines whether to approve or deny the delivery of the arrived article on the basis of the checking result at step S510. If the delivery of the arrived article is approved, the home network server 100 transmits the delivery information on the delivery-approved article to the smart communicator 400 at step S520.

On the other hand, if the delivery of the arrived article is denied, the home network server 100 transmits the information on the delivery-denied article to the smart communicator 400 at step S530.

Upon receiving the information on the delivery-denied article, the smart communicator 400 receives a key input of request for communication with the deliveryman and transmits the communication request to the door phone 700 through the home network server 100 at steps S540 and S550. Once the deliveryman responses to the communication request, the home network server 100 establishes a communication channel between the door phone 700 and the smart communicator 400 such that the deliveryman can communicate with a user of the smart communicator at step S560.

After the communication between the deliveryman and the smart communicator user, the smart communicator receives a key input for opening or closing the mail drop 260 of the mailbox 200 at step S570. Upon receiving a key input for opening command, the smart communicator 400 transmits the mail drop open command to the home network server 100 at step S580.

Upon receiving the mail drop open command, the home network server 100 transmits the open command to the mailbox 200 at step S590. Accordingly, the mail drop controller 280 opens the mail drop on the basis of the open command at step S610.

In the meantime, if the mail drop close command is input at step S570, the smart communicator transmits an mail drop close maintenance command to the home network server at step S620. If the mail drop close maintenance command is received, the home network server 100 forwards the mail drop close maintenance command to the mailbox 200 at step S630. Accordingly, the mail drop controller 280 closes the mail drop 260 at step S640.

As described above, the home network server 100 stores the information on articles reserved to be delivered, reads information from RFID tag(s) corresponding to the articles, determines whether an arrived article is identical to any articles reserved to be delivered, transmits the result of the comparison the smart communicator 400, and closes or opens the mail drop of the mailbox according to a remote command received from the smart communicator 400, such that it is possible to check the arrived article, determines to approve or deny the delivery of the article, and control the open/close of the mail drop 260 of the mailbox 200 on the basis of the determination result, even remotely.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

In accordance with the present invention, it is possible to check the arrival of an article and control follow-up management on the article even when the article is mis-delivered, by storing the information corresponding to the article ordered and reserved to be transported in a database, reading the information from a RFID tag associated with the arrived article, determining whether the arrived article is correctly delivered on the basis of the comparison between the stored information and the information read from the RFID tag, transmitting the comparison result to the smart communicator (which can be located at a remote location), and managing the article according to the control command received from the smart communicator.

In accordance with the present invention, it is also possible to check the arrival of an article and control follow-up management on the article even when the article is mis-delivered, by storing the information on the article reserved to be transported, reading the information of the article from an RFID tag associated with the article, determining whether the arrived article corresponds with the article reserved to be transported, transmitting the determination result to a smart communicator (which can be remotely located), and controlling the mailbox to open/close a mail drop of the mail box according to the command received from the smart communicator.

What is claimed is:

1. A delivery management method performed by a portable smart communicator, the method comprising:
   transmitting, to a selling server, a request message for ordering an article;
   transmitting, to a home network server, information about the ordered article;
   receiving, from the home network server, delivery information about arrival of the article;
   receiving a comparison result from the home network server by comparing the information about the ordered article and the delivery information read from an article identifier provided with the delivered article; and
   transmitting to a delivery server information for re-delivery of the ordered article based on the comparison result,
   wherein the comparison result indicates that the delivered article is incorrectly delivered.

2. The delivery management method of claim 1, further comprising remote-controlling withdrawal of the arrived article.

3. The delivery management method of claim 2, wherein remote-controlling withdrawal of the arrived article includes:
   receiving a withdrawal schedule request message regarding arrival of the article from a delivery server; and
   transmitting a withdrawal schedule input, by a user in response to the withdrawal schedule request message, to the home network server and the delivery server.

4. The delivery management method of claim 1, wherein the information about the ordered article is information of a Radio Frequency IDentification (RFID) tag affixed to the ordered article.

5. The delivery management method of claim 4, wherein the information about the ordered article includes a delivery schedule for the ordered article.

6. The delivery management method of claim 5, further comprising receiving the delivery schedule for the ordered article from a delivery server.

7. A portable smart communicator comprising:
   a wireless communication unit for communicating with a home network server and a selling server; and
   a controller for controlling the wireless communication unit to transmit, to the selling server, a request message for ordering an article, to transmit, to the home network server, information about the ordered article, to receive, from the home network server, delivery information about arrival of the article, to transmit information for re-delivery of the ordered article based on the received delivery information, to receive a comparison result from the home network server by comparing the information about the ordered article and the delivery information read from an article identifier provided with the delivered article, and to transmit to a delivery server information for re-delivery of the ordered article based on the comparison result,
   wherein the comparison result indicates that the delivered article is incorrectly delivered.

8. The portable smart communicator of claim 7, wherein the controller remote-controls withdrawal of the arrived article.

9. The portable smart communicator of claim 8, wherein the controller controls the wireless communication unit to receive a withdrawal schedule request message regarding the arrived article from a delivery server and to transmit a withdrawal schedule, input by a user in response to the withdrawal schedule request message, to the home network server and the delivery server.

10. The portable smart communicator of claim 7, wherein the information about the ordered article is information of a Radio Frequency IDentification (RFID) tag affixed to the ordered article.

11. The portable smart communicator of claim 10, wherein the information about the ordered article includes a delivery schedule of the ordered article.

12. The portable smart communicator of claim 11, wherein the controller controls the wireless communication unit to receive the delivery schedule of the ordered article from a delivery server.

13. The portable smart communicator of claim 7, wherein the wireless communication unit comprises a local communication unit for communicating with the home network server and a remote communication unit for communicating with the selling server.

* * * * *